(12) United States Patent
Biancalana et al.

(10) Patent No.: US 11,504,997 B2
(45) Date of Patent: Nov. 22, 2022

(54) WHEEL RIM FOR A VEHICLE

(71) Applicant: FERRARI S.p.A., Modena (IT)

(72) Inventors: Matteo Biancalana, Modena (IT); Michele Zanchini, Modena (IT)

(73) Assignee: FERRARI S.P.A., Modena (IT)

( * ) Notice: Subject to any disclaimer, the term of this patent is extended or adjusted under 35 U.S.C. 154(b) by 468 days.

(21) Appl. No.: 16/676,565

(22) Filed: Nov. 7, 2019

(65) Prior Publication Data
US 2020/0147997 A1 May 14, 2020

(30) Foreign Application Priority Data
Nov. 9, 2018 (IT) ........................ 102018000010194

(51) Int. Cl.
*B60B 1/06* (2006.01)
*B60B 7/06* (2006.01)
*B62D 35/02* (2006.01)

(52) U.S. Cl.
CPC ............... *B60B 1/06* (2013.01); *B60B 7/063* (2013.01); *B62D 35/02* (2013.01); *B60B 2900/1216* (2013.01); *B60B 2900/513* (2013.01)

(58) Field of Classification Search
CPC ... B60B 1/06; B60B 7/063; B60B 2900/1216; B60B 2900/513; B62D 35/02
See application file for complete search history.

(56) References Cited

U.S. PATENT DOCUMENTS

| 2009/0236902 A1* | 9/2009 | Zibkoff | ................. B60B 21/062 |
| | | | 301/104 |
| 2014/0191565 A1 | 7/2014 | Gebeau et al. | |
| 2017/0232790 A1* | 8/2017 | Hall | ...................... B60B 21/023 |
| | | | 301/58 |

FOREIGN PATENT DOCUMENTS

| EP | 3103652 A1 | 12/2016 |
| FR | 3041897 A1 | 4/2017 |
| FR | 3045460 A1 | 6/2017 |

OTHER PUBLICATIONS

Search Report issued in Italian Application No. 201800010194, dated September 9, 2109; 7 pages.

* cited by examiner

*Primary Examiner* — Scott A Browne
(74) *Attorney, Agent, or Firm* — Cantor Colburn LLP

(57) ABSTRACT

A wheel rim having a central axis and comprising a central hub configured to be fixed to a suspension of a vehicle; a peripheral ring, which is arranged around the hub with a predetermined radial distance from the hub itself and is configured to receive a tire of the vehicle on a radially outermost surface thereof; a plurality of spokes equally spaced angularly from one another around the axis and connecting the peripheral ring to the hub; and at least one projection protruding in a cantilever fashion towards the hub, starting from a radially innermost surface of the peripheral ring, opposite to the radially outermost surface, and defining an airfoil configured to generate, in use, during the forward travel of the vehicle, a channelling of the air towards the outside of the wheel rim.

7 Claims, 4 Drawing Sheets

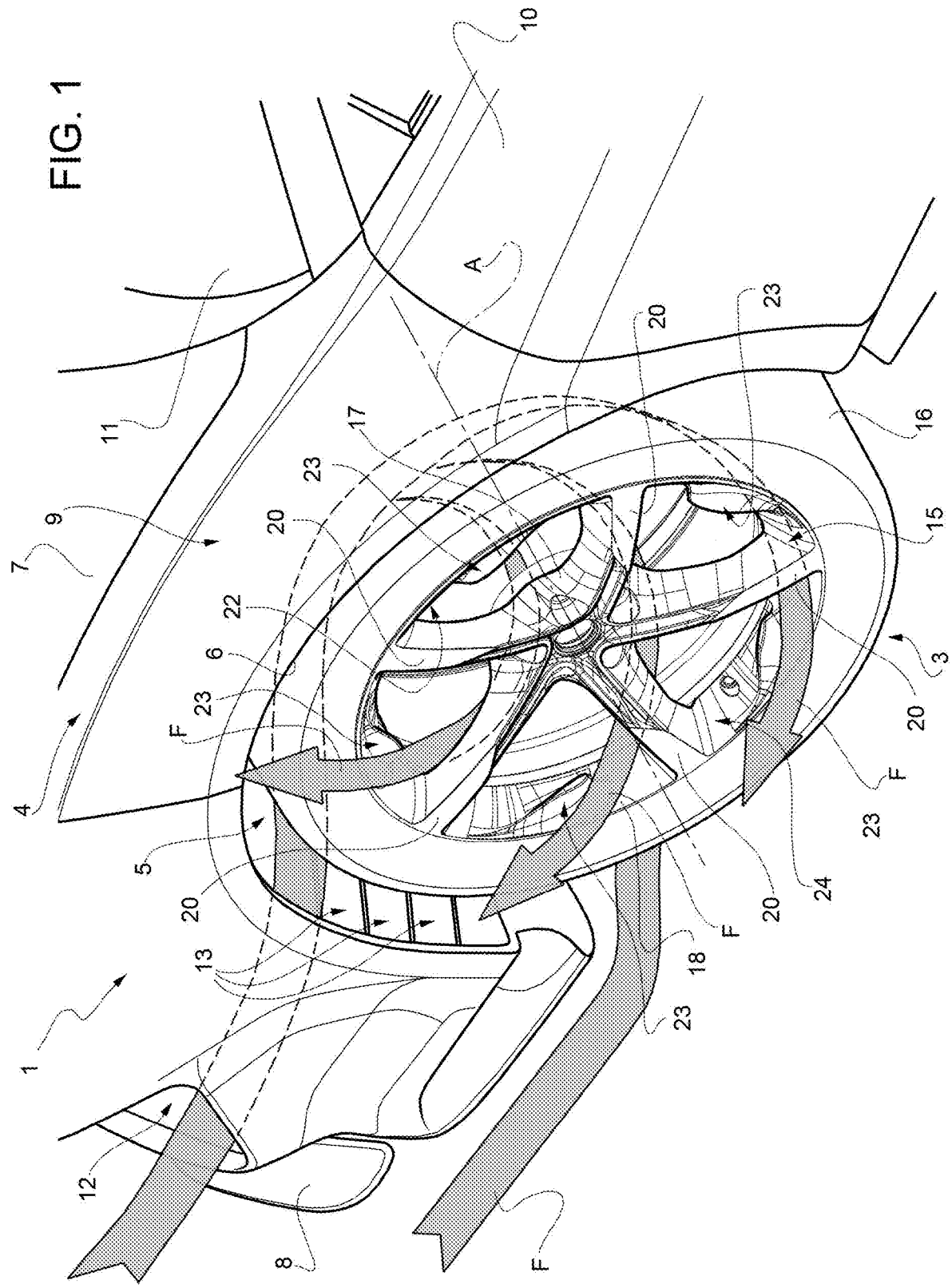

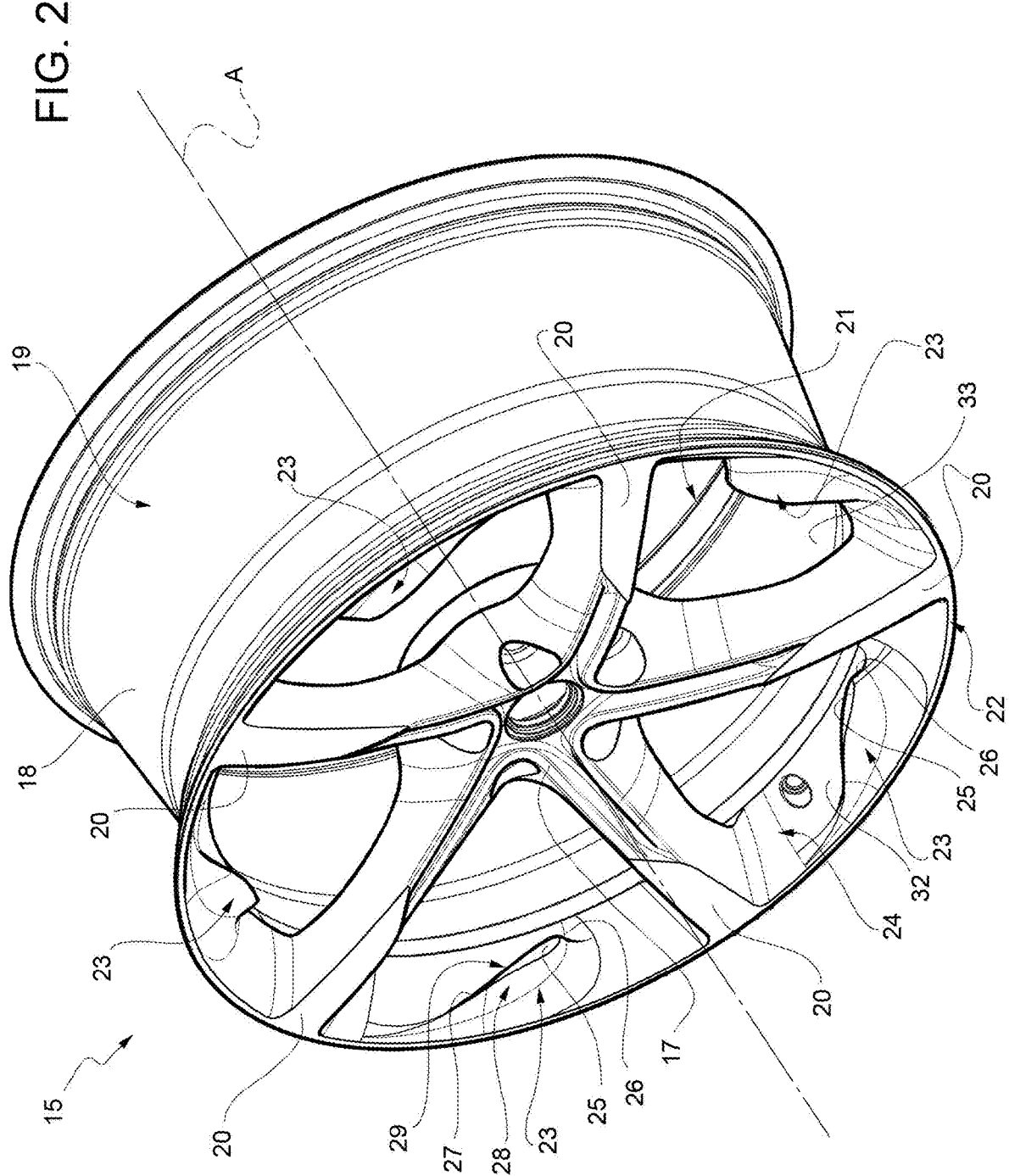

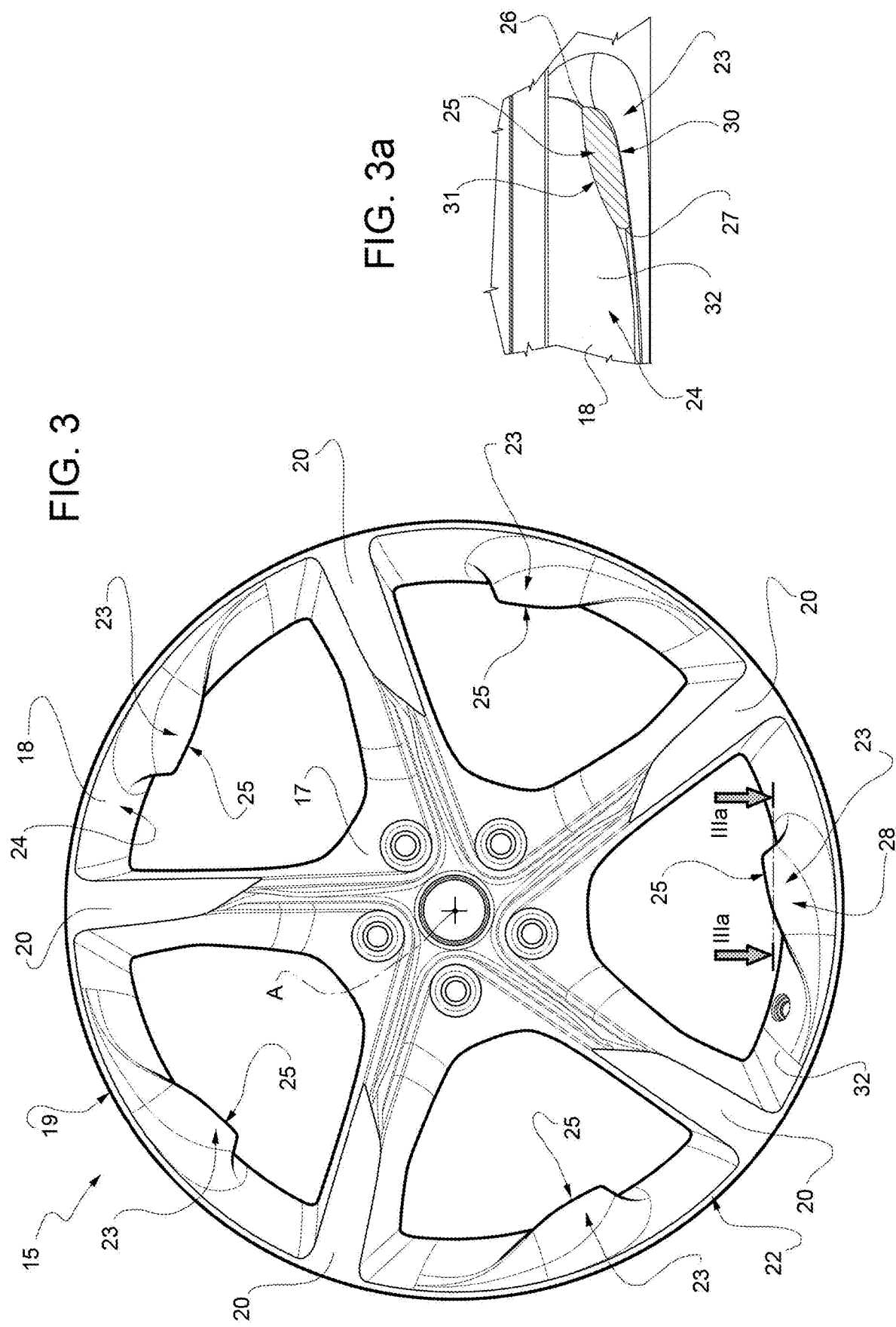

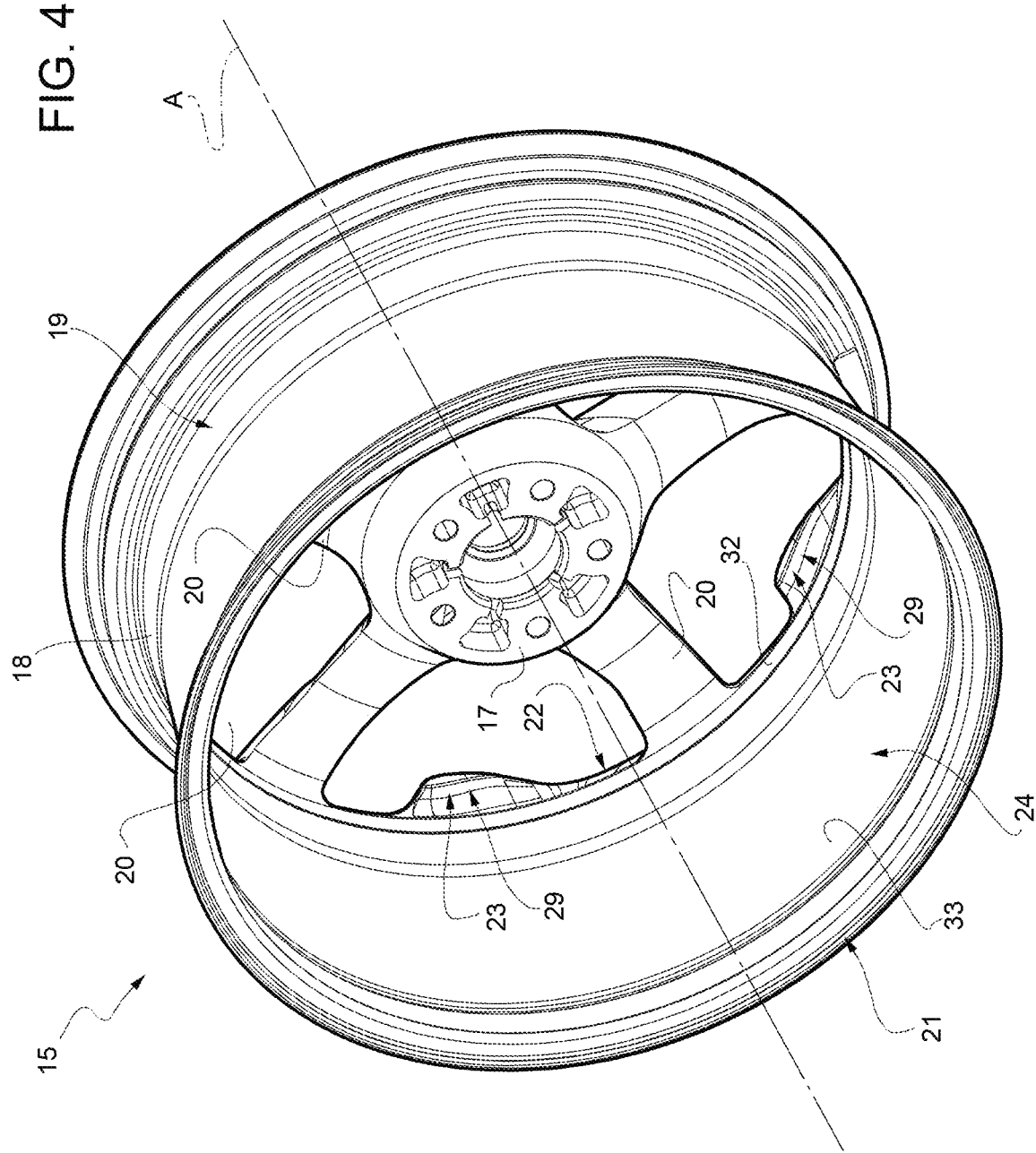

WHEEL RIM FOR A VEHICLE

CROSS-REFERENCE TO RELATED APPLICATIONS

This patent application claims priority from Italian patent application no. 102018000010194 filed on Nov. 9, 2018, the entire disclosure of which is incorporated herein by reference.

FIELD OF THE ART

The present invention relates to a wheel rim for a vehicle, in particular for a motor-vehicle, preferably for a motor-vehicle of the high-performance type, to which the following description will make explicit reference without thereby losing in generality.

PRIOR ART

As is known, a wheel rim is the part of the wheel, which connects the tire to the vehicle. In particular, the wheel rim and the tire thereof are normally housed in special compartments of the bodywork of the vehicle, called "wheel compartments" and delimited by arch-shaped bodywork parts known as "wheel arches". Wheel rims of the known type have a central axis and generally comprise:
  a central hub configured to be fixed to a suspension of the vehicle;
  a peripheral ring, which is arranged around the central hub with a predetermined radial distance from the hub itself and onto which the tire is directly mounted; and
  a series of spokes equally spaced angularly from one another around the axis of the wheel rim, extending radially and connecting the peripheral ring to the central hub.

A wheel rim should be as light as possible, since it constitutes a non-suspended mass of the vehicle; thus, the wheel rim contributes to increasing the overall non-suspended mass, consequently increasing the inertia of the suspensions; basically, if the wheel rims are too heavy, the suspensions must manage greater weights and they are thus less reactive, with a consequent increase in the difficult of maintaining an optimum road grip, especially in the case of a high-performance motor-vehicle.

It should also be noted that an increase in the mass of the wheel rim determines a corresponding increase in the rotational inertia, which increases the resistance of the wheel to change the direction thereof, with effects on the responsiveness of the steering.

Another very important aspect, which must be considered in the design of a wheel rim, is the effect it has on the aerodynamics of the vehicle.

As is known, in high-performance motor-vehicles, the aerodynamics are studied to generate an elevated aerodynamic downforce (or rather an elevated aerodynamic thrust downwards) simultaneously trying to minimise the aerodynamic resistance on advancing. Consequently, the aerodynamic efficiency of a motor-vehicle is assessed according to the ratio between the aerodynamic downforce and the corresponding aerodynamic resistance on advancing: the higher this ratio is, the greater the aerodynamic efficiency of the motor-vehicle.

The wheels and with these the respective wheel rims have a significant impact on the aerodynamic resistance and thus the need is felt in the sector to adopt suitable measures to minimise the effects of such resistance.

Another problematic aspect, which must be considered in relation to the wheel rims of the known type for high-performance motor-vehicles, is the expulsion of air from the wheel compartments. For example, the radiators and the diffusers present in the front part of the motor-vehicle create airflows in the area of the respective wheels. Such flows generate an aerodynamic load on the front part of the motor-vehicle and ventilate the area of the wheels. However, the presence of the brake discs of the wheel rims and tires tends to close the wheel compartments, in use, with consequent difficulties in expelling the air entering such spaces; the result is a sort of "inflation" of the wheel compartments, with an increase in local pressure due to the fact that the speed of the air entering the wheel compartments is greater than that being expelled from the same.

Thus, the need is felt in the sector to improve the expulsion of air by the wheel rims during the travel of the vehicle in the forward direction.

DESCRIPTION OF THE INVENTION

It is an object of the present invention to produce a wheel rim for a vehicle, in particular for a motor-vehicle, which allows at least one of the aforesaid needs to be met in a simple and inexpensive manner.

According to the present invention, a wheel rim is made for a vehicle, in particular for a motor-vehicle, as claimed in claim 1 and in the claims dependent thereon.

The present invention also relates to a vehicle as claimed in claim 7.

BRIEF DESCRIPTION OF THE DRAWINGS

The present invention will now be described with reference to the accompanying drawings, illustrating a non-limiting embodiment thereof, wherein:
  FIG. 1 shows a perspective view of a front portion of a motor-vehicle provided with a wheel rim according to the present invention, highlighting some air flows, which are created during the forward travel of the motor-vehicle itself;
  FIG. 2 shows a front-side perspective view of the wheel rim in FIG. 1, on an enlarged scale;
  FIG. 3 shows a front view of the wheel rim in FIG. 2;
  FIG. 3a is a section according to the line III-III in FIG. 3; and
  FIG. 4 shows a rear-side perspective view of the wheel rim in FIG. 2.

PREFERRED EMBODIMENT OF THE INVENTION

A front portion of a vehicle is partially shown in FIG. 1, in this case a motor-vehicle 1, preferably of the high-performance type. The motor-vehicle 1 has four wheels 3, two front (only one is shown, in particular, the one relating to the left-side drive) and two rear (not shown), and it comprises an outer body 4, defining four side wheel compartments 5 (only one of which is shown, in particular relating to the left-side drive), designed to house the respective wheels 3.

Each wheel compartment 5 is delimited at the side by an arch-shaped bodywork element known as a wheel arch 6.

The outer body 4 comprises, amongst other things, a front bonnet 7, a front bumper 8, two sides 9 (only one of which is partially visible) and including respective doors 10, and a windscreen 11. Furthermore, in the front area between the bonnet 7 and the bumper 8, one or more air intakes 12 can be present, which, together with respective openings 13 obtained in the wheel arch 6 adjacent thereto, allow, during the forward travel of the motor-vehicle 1, the generation of airflows, which cross the relative wheel compartment 5.

Further airflows towards the wheel compartments 5 are generated by the radiator (known in itself and not shown), which is usually placed at the front inside the engine compartment of the motor-vehicle 1, and/or by the diffuser (also known per se and not shown), positioned on the bottom of the motor-vehicle 1.

Some of the aforesaid air flows, which cross, for example, the front wheel compartment 5, placed on the left-side drive, and the respective wheel 3 are indicated by the arrows F in FIG. 1.

With reference to the appended figures, each wheel 3 essentially comprises a wheel rim 15, made according to the teachings of the present invention and fixed, in use, in a known manner, to a relative suspension (also known and not shown) of the motor-vehicle 1, and a tire 16 mounted peripherally onto the wheel rim 15.

In particular, the wheel rim 15 has an axis A, coinciding, in use, with the axis of the wheel 3, and comprises:
- a central hub 17 configured to be fixed to the respective suspension;
- a peripheral ring 18, which is arranged around the hub 17 with a predetermined radial distance from the latter and configured to receive the tire 16 on a radially outermost surface 19 thereof; and
- a plurality of spokes 20 equally spaced angularly from one another around the axis A and connecting the peripheral ring 18 to the hub 17.

As can be seen, in particular, in FIGS. 2 and 4, the peripheral ring 18 delimits a rear opening 21 on opposite sides, configured to be arranged, in use, inside the respective wheel compartment 5, and a front opening 22 facing the rear opening 21 and turned, in use, towards the outside of the motor-vehicle 1.

Advantageously, the wheel rim 15 further comprises one or more projections 23, in this case shown in an equal number to the number of the spokes 20 protruding in a cantilever fashion towards the hub 17, starting from a radially innermost surface 24 of the peripheral ring 18, opposite to the radially outermost surface 19, and defining an airfoil 25 (see, in particular, FIG. 3a) configured to generate, in use, during the forward travel of the motor-vehicle 1, a channelling of the air entering from the rear opening 21 towards the front opening and from here, towards the outside of the wheel rim 15 itself.

In particular, the flow of air across the wheel rim 15 as diverted by the projections 23 is shown by way of example, by the arrows F, in FIG. 1.

As can be seen in the attached figures, each projection 23 is arranged in a position circumferentially interposed between two spokes 20 adjacent thereto.

Each projection 23 further has a configuration tapered towards the free end thereof, facing the hub 17.

With particular reference to FIG. 3a, the airfoil 25 defined by each projection 23 has an attack edge 26 and an output edge 27; the attack edge 26 is arranged at a distance from the rear opening 21, measured parallel to the axis A, which is smaller than that of the output edge 27.

In greater detail, with reference to the rotation direction, in use, of the wheel rim 15 during the forward travel of the motor-vehicle 1 (anti-clockwise in FIG. 1 considering the left-side drive of the motor-vehicle 1, clockwise in the case of the right passenger side), the output edge 27 of the airfoil 25 of each projection 23 is arranged circumferentially closer to the spoke 20, which follows it, than the attack edge 26.

Each wheel rim 23 is delimited by a first curvilinear surface 28 facing the front opening 22 and by a second curvilinear surface 29 facing the rear opening 21; the airfoil 25 associated with each projection 23 has (FIG. 3a) a back 30 defined by the curvilinear surface 28 and a belly 31 defined by the curvilinear surface 29; the back 30 and the belly 31 mutually connecting the attack edge 26 to the output edge 27.

As can be seen in detail in FIGS. 2, 3 and 3a, the extension of the back 30 of the airfoil 25 defined by each projection 23 converges towards a front surface of the spoke 20, which precedes it with reference to the rotation direction, in use, of the wheel rim 15 during the forward travel of the motor-vehicle 1; differently, the extension of the back 30 of the airfoil 25 defined by each projection 23 is directed towards the rear opening 21 and extends substantially parallel to the axis A.

With reference to FIGS. 2 and 4, the radially innermost surface 24 of the peripheral ring 18 comprises a first circumferential band 32 adjacent to the front opening 22 and a second circumferential band 33 adjacent to the rear opening 21; the circumferential bands 32 and 33 are adjacent to each other.

As can be noted from FIGS. 2 and 4, the spokes 20 and the projections 23 rest on the circumferential band 32 of the radially innermost surface 24 of the peripheral ring 18. Furthermore, each projection 23 extends obliquely along the relative circumferential band 32, with the attack 26 and output edges 27 of the airfoil 25 associated with the projection 23 itself adjacent to the spoke 20, which precedes it and to the spoke 20, which follows it respectively, with reference to the rotation direction, in use, of the wheel rim 15 during the forward travel of the motor-vehicle 1. In use, during the forward travel of the motor-vehicle 1, the projections 23 of the wheel rim 15 have the effect of increasing the extractions of air from the respective wheel compartment 5, with a consequent reduction in pressure in the respective wheel arch 6. In detail, during the forward travel of the motor-vehicle 1, the airfoils 25 generate local accelerations of air especially in the peripheral area of the wheel rim 15, i.e. the one which is normally placed in a radially outermost position with respect to the space occupied by the respective brake disc (known in itself and not shown).

More specifically, as can be seen in FIG. 1, the particular geometry of the projections 23 shaped as airfoils 25, as well as the particular arrangement thereof on the peripheral ring 18 allows the wheel rim 15 to function like the propeller of an impeller during the forward travel of the motor-vehicle 1; this allows air to be expelled from the respective wheel compartment 5 with considerable efficiency, guaranteeing two main effects (detected in the wind tunnel by means of special models on a scale to 50%):
- increasing the removal of hot air from the wheel compartment 5 with consequent benefits on the cooling of the actuator devices mounted on the wheel 3, for example callipers and brake disc; and
- creating, by vorticity, an air cushion in front of the wheel rim 15, which is such that the longitudinal aerodynamic flow on the motor-vehicle 1 is not affected by the presence of the wheel rim 15 and remains constant on the respective side 9, reducing the Cx of the motor-vehicle.

In this way, it is also possible to obtain the following further effects:
- reduce the pressure on the wheel arches 6;

increase the aerodynamic load; and increase the air flows, crossing the radiators of the motor-vehicle 1 and then escaping into the wheel arches 6.

Finally, it is clear that modifications and variations can be made to the wheel rim 15 and to the motor-vehicle 1 described and illustrated here, without thereby departing from the scope of protection defined by the claims.

The invention claimed is:

1. A wheel rim for a vehicle having a central axis (A) and comprising:
   a central hub configured to be fixed to a suspension of said vehicle;
   a peripheral ring, which is arranged around said hub with a predetermined radial distance from the hub itself and is configured to receive a tire of said vehicle on a radially outermost surface thereof; and
   a plurality of spokes equally spaced angularly from one another around said axis (A) and connecting said peripheral ring to said hub; and
   at least one projection protruding in a cantilever fashion towards the hub;
   wherein said peripheral ring delimits, on opposite sides, a rear opening, configured to be arranged, in use, inside said vehicle, and a front opening facing said rear opening;
   wherein said projection defines an airfoil configured to generate, in use, during the forward travel of said vehicle, a channeling of the air entering from said rear opening towards said front opening and from here towards the outside of said wheel rim;
   wherein said projection is arranged in a position circumferentially interposed between two said spokes;
   wherein the airfoil defined by said projection has an attack edge and an output edge; and
   wherein said attack edge is arranged at a distance from said rear opening, measured parallel to said axis (A), which is smaller than a distance of said output edge from the rear opening itself;
   wherein said projection starts from a radially innermost surface of said peripheral ring, opposite to said radially outermost surface
   wherein said projection is delimited by a first curvilinear surface facing said front opening (22) and by a second curvilinear surface facing said rear opening (21); and
   wherein the airfoil associated with said projection has a back defined by said first curvilinear surface and a belly defined by said second curvilinear surface; said back and said belly mutually connecting said attack edge and said output edge.

2. The wheel rim according to claim 1, wherein, with reference to the rotation direction, in use, of the wheel rim during the travel of said vehicle in a forward direction, said output edge is arranged circumferentially closer to the spoke, which follows it, than to said attack edge.

3. The wheel rim according to claim 1, wherein prolongation of the back of the airfoil defined by said projection converges towards a front surface of the spoke preceding the airfoil itself with reference to the rotation direction, in use, of the wheel rim during the forward travel of said vehicle.

4. The wheel rim according to claim 3, wherein the extension of the back of the airfoil defined by said projection is directed towards said rear opening and extends substantially parallel to said axis (A).

5. The wheel rim according to claim 1, wherein said radially innermost surface of said peripheral ring comprises a first circumferential band adjacent to said front opening and a second circumferential band adjacent to said rear opening, and wherein said projection rests on said first circumferential band of said radially innermost surface of said peripheral ring.

6. The wheel rim according to claim 1, comprising a plurality of said projections, equally spaced angularly from one another around said axis (A) and each circumferentially interposed between a respective pair of said spokes.

7. A vehicle (1) comprising an outer body and at least two wheels, each of which includes a wheel rim and a tire mounted peripherally onto said wheel rim, wherein each said wheel rim is made according to claim 1.

* * * * *